United States Patent [19]
Josephs

[11] Patent Number: 5,465,807
[45] Date of Patent: Nov. 14, 1995

[54] SAFETY GUARD FOR HAND TRUCKS OR LIFT GATES

[75] Inventor: Harold Josephs, 25311 Ronald Ct., Oak Park, Mich. 48237

[73] Assignee: Harold Josephs, Oak Park, Mich.

[21] Appl. No.: 266,726

[22] Filed: Jun. 27, 1994

[51] Int. Cl.⁶ .................................................. B60K 28/10
[52] U.S. Cl. ......................... 180/274; 180/277; 340/436; 293/4; 200/61.44
[58] Field of Search ...................................... 180/274, 276, 180/277, 278; 340/436, 437; 293/4; 200/61.44

[56] References Cited

U.S. PATENT DOCUMENTS

| | | | |
|---|---|---|---|
| 2,048,514 | 7/1936 | Peelle | 268/59 |
| 2,902,105 | 9/1959 | Wiley et al. | 180/82 |
| 3,411,060 | 11/1968 | Pung et al. | 318/283 |
| 3,599,744 | 8/1971 | Saterfield | 200/61.44 |
| 3,664,701 | 5/1972 | Kondur | 293/4 |
| 3,724,586 | 4/1973 | Goodacre | 180/274 |
| 4,091,906 | 5/1978 | Clarke et al. | 200/61.44 X |
| 4,392,771 | 7/1983 | Smalley | 414/545 |
| 4,540,329 | 9/1985 | Martin | 414/545 |
| 4,802,548 | 2/1989 | Kausch | 180/274 |
| 4,934,478 | 8/1990 | Melocik et al. | 180/277 |
| 5,023,444 | 6/1991 | Ohman | 180/224 X |
| 5,343,739 | 9/1994 | Curry | 340/436 X |

FOREIGN PATENT DOCUMENTS 0031135  3/1979  Japan ............................ 293/4

Primary Examiner—Margaret A. Focarino
Assistant Examiner—Christopher Ellis
Attorney, Agent, or Firm—Brooks & Kushman

[57] ABSTRACT

A safety guard uses a strip switch to prevent injury at pinch points on either lift gates or pedestrian-operated industrial trucks. A strip switch is provided at the pinch point between the lift gate and the truck bed or vehicle body to stop or reverse operation of the lift gate when contacted by body parts or items improperly loaded on the lift gate. A strip switch may also be located adjacent the portions of a pedestrian-operated lift truck. The strip switch is disposed located about a portion of the perimeter of the pedestrian-operated lift truck adjacent the operator. Upon contacting the strip switch, the pedestrian-operated lift truck may be stopped or reversed to permit the operator to free his foot from the potential pinch point where injury can occur. Another approach to minimizing injury from pedestrian-operated lift trucks is to provide a semi-rigid guard attached to the platform body of the pedestrian-operated lift truck which reduces the size of the pinch point and minimizes the hazard of the pedestrian-operated lift truck overrunning an operator's foot.

5 Claims, 2 Drawing Sheets

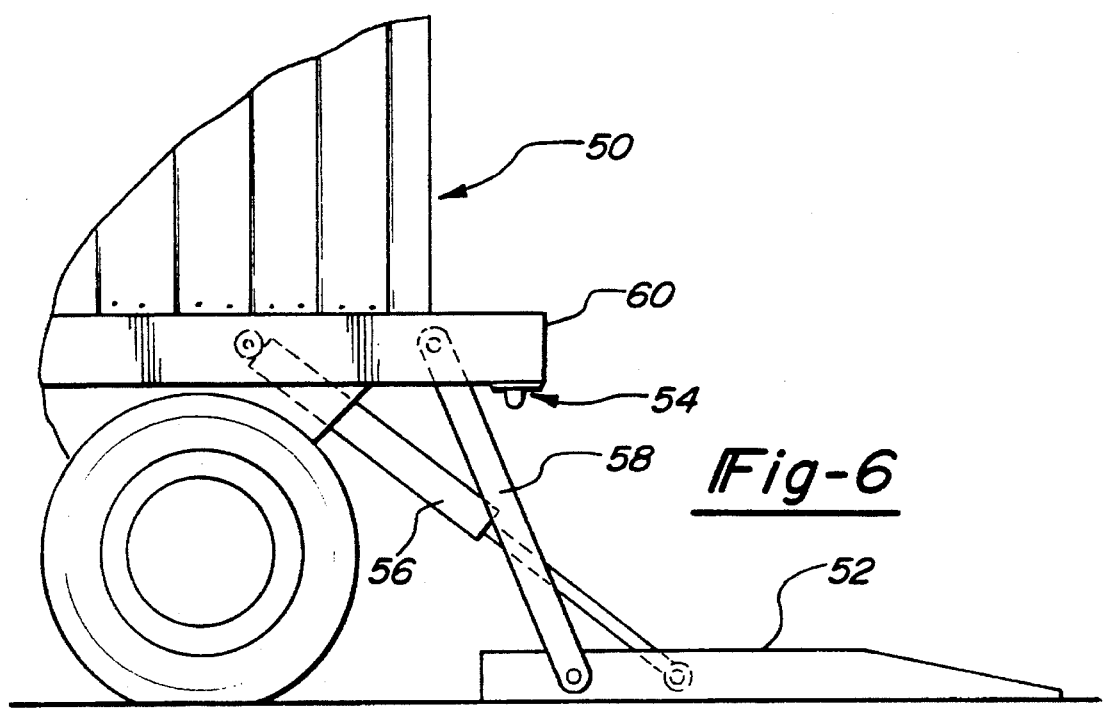
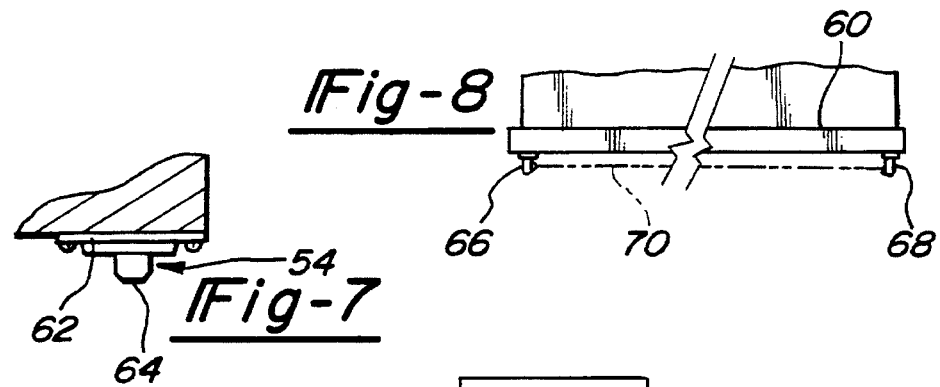
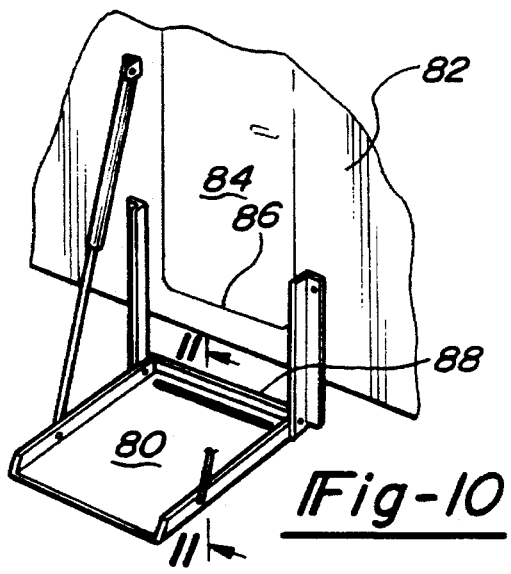
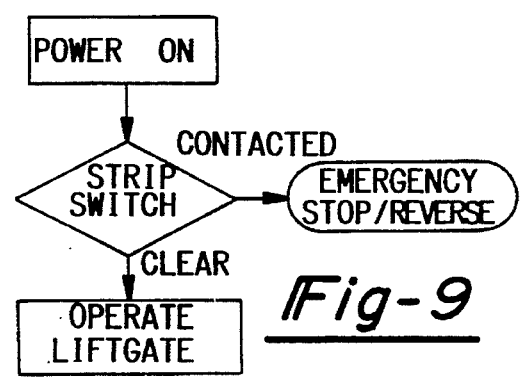
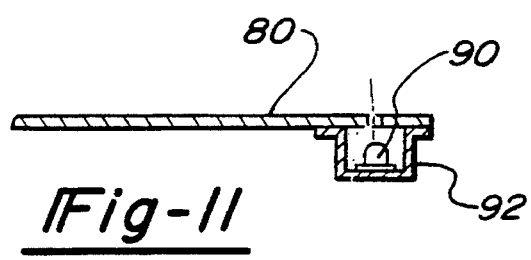

5,465,807

SAFETY GUARD FOR HAND TRUCKS OR LIFT GATES

TECHNICAL FIELD

This invention relates to safety devices for preventing injury from pinch points known to exist as a result of operation of pedestrian-operated industrial trucks and vehicle-mounted lift gates.

BACKGROUND ART

Accidental injuries caused by operation of power driven machinery and equipment can create pinch points. Serious personal injuries have occurred and are foreseeable in the use of lift gates and pedestrian-operated industrial trucks.

Lift gates are provided on various vehicles such as tractor-trailers, delivery vans, moving vans and in a modified form on vehicles for transporting handicapped persons in wheelchairs. Broadly defined, lift gates are movable platforms which may be lowered to load cargo onto the lift gate and then raised to a truck bed or vehicle doorway. As a lift gate is moved to its raised position, it is driven into contact with or moved closely adjacent to the truck bed or vehicle body creating a pinch point. Foreseeable injuries to the foot of a person standing on a lift gate or the hand or arm of a person standing next to a lift gate, perhaps steadying a load on the lift gate, will occur if such body parts are placed in the pinch point between the lift gate and the truck bed or vehicle body. This can result in painful crushing injuries to feet, hands or arms which may cause disfiguring injuries, amputation, or even death.

Foreseeable improper operation of a lift gate can also cause damage to property transported by the lift gate if an object becomes caught between the lift gate and the truck bed or vehicle body. For example, moving vans used by professional movers and untrained individuals frequently are equipped with hydraulically-operated lift gates. If a load is improperly placed on the lift gate, it can become wedged in the pinch point resulting in damage to the property on the lift gate or the lift gate mechanism itself. If a load is improperly loaded and becomes caught in the pinch point, it is foreseeable that the load could shift or even fall off the lift gate, causing injury to people near on or around the lift gate.

One example of a prior art lift gate which incorporates a safety device is disclosed in U.S. Pat. No. 4,540,329 issued to Martin. The safety device disclosed in the Martin patent is intended to allow the lift gate to be safely lowered to the ground and minimize the chance for injury as the lift gate is lowered to the ground. The Martin device does not include any provision for preventing injury as the lift gate is raised. In fact, the structure of the lift gate disclosed in Martin creates a guillotine-like action wherein the lift gate could sever the foot of a person standing on a lift as the lift gate moves to the point at which it passes by the truck bed to come to a raised position wherein the lift gate is at the same height as the truck bed.

Hydraulic lifts used for transporting handicapped persons in wheelchairs such as that disclosed in U.S. Pat. No. 4,392,771 to Smalley have been developed to minimize the chance of injury when lowering the lift to the ground. Nothing is disclosed in the Smalley patent which would prevent injury in the event that a person's foot or wheelchair became trapped between the lift gate and the vehicle body. A wheelchair-confined person could foreseeably suffer further debilitating injury by having their foot trapped between the gate and the vehicle body. In addition, if a part of the wheelchair became caught between the vehicle body and the rising lift gate, the wheelchair could be damaged or, worse yet, flipped from the ramp on to the ground, possibly resulting in a serious injury accident.

Another Common and foreseeable injury involves pedestrian-operated industrial lift trucks which are moved and guided by an operator walking alongside the lift truck and controlling the lift truck with a handle control. U.S. Pat. No. 2,902,015 to Wylie discloses a safety system for preventing injuries when the handle comes into contact with a wall, post or other object trapping or injuring the operator. The Wylie device does not include any safety system to prevent the industrial truck from overrunning the foot or even leg of the lift truck operator. The operator typically walks alongside or in front of the pedestrian-operated industrial truck which moves at walking speed or faster, sometimes within a few inches of an operator's foot. It is therefore foreseeable that an operator's foot or leg could become trapped between the bed of the industrial lift truck and the floor over which the truck is moved. It is foreseeable that a crushing injury to an operator's foot or leg and serious lacerations could occur if they are overrun by the pedestrian-operated industrial lift truck.

The above-stated foreseeable hazards and others establish that there is a long-felt need for a device for preventing injury as a result of the operation of industrial lift trucks or lift gates.

SUMMARY OF THE INVENTION

It is an object of the present invention to provide a simple and inexpensive safety guard for lift gates and pedestrian-operated industrial trucks which include a power drive mechanism that is disabled or reversed upon sensing the presence of a body part or object in a pinch point location.

It is another object of the present invention to provide an actuator which opens a circuit including the drive motor when an object is sensed in a pinch point formed by raising a lift gate on a vehicle to a raised position so that the motor is disabled or reversed prior to the occurrence of injury to hands, feet or arms extending into the pinch point area.

It is another object of the present invention to provide a pedestrian-operated industrial lift truck with a safety system for disabling or reversing the direction of movement of the pedestrian-operated industrial lift truck in the event that the lift truck overruns the operator's foot or leg.

According to another aspect of the present invention, a vehicle lift gate system comprising a vehicle having an opening for receiving articles which is defined in part by a lower edge and a lift gate which is movable between a raised position adjacent the lower edge and a lowered position spaced below the lower edge of the opening. The vehicle lift gate system includes a prime mover which is operatively connected between the vehicle and the lift gate for driving the lift gate between its raised and lowered positions. A switch is electrically connected to the prime mover to stop movement of the lift gate from the lowered position toward the raised position. An actuator for the switch spans the lower edge of the opening and is oriented to be actuated by the presence of a foreign object disposed in the space between the lift gate in its lowered position and the lower edge of the opening when the lift gate is moved from the lowered position to the raised position. In the event a foreign object contacts the actuator, the switch will be effective to stop movement of the lift gate toward the raised position before serious injury or damage can occur.

The above-described vehicle lift gate system can be applied to truck lift gates and lift gates for handicapped transport vehicles. Actuators usable with the vehicle lift gate system may include a strip switch, light beam switch or other proximity switch which extends into the area where the pinch point is located. The proximity switch may be located either on the vehicle or on the lift gate and should be closely adjacent the pinch point area when the lift gate is raised between the lift gate and the vehicle.

According to another aspect of the present invention, a pedestrian-operated industrial lift truck which is adapted to be operated on the floor is provided with a safety mechanism to eliminate injury caused by the pedestrian-operated lift truck overrunning an operator's or other person's foot or leg. The pedestrian-operated industrial lift truck preferably includes a platform body which is supported on a floor on a plurality of wheels. A driving motor is supported by the platform body and is operatively connected in a driving relationship to at least one of the wheels. A switch is electrically connected to the driving motor to selectively stop operation of the driving motor. An actuator associated with the switch is secured adjacent the floor facing surface of the platform body whereby the actuator actuates the switch when the platform body overruns a foreign object on the floor which is a sufficient height to contact the platform body.

According to another aspect of the present invention, the switch may be electrically connected to the driving motor so as to be actuatable to automatically reverse operation of the driving motor along the pedestrian-operated industrial lift truck to automatically move clear of the operator's foot or leg.

The switch is preferably a strip switch mounted on the floor facing surface of the platform body to provide a simple and reliable actuator. Alternatively, the pedestrian-operated industrial lift truck may be provided with a semi-rigid guard attached to the platform body and extending toward the floor to minimize the gap between the platform body and the floor. The guard preferably spans the periphery of the platform and regions proximate the pedestrian operator where it would be foreseeable for the operator's foot to be overrun by the lift truck.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 6 is a perspective view of a truck having a hydraulically-operated lift gate including the safety guard of the present invention;

FIG. 7 is a cross-sectional view taken along the line 7—7 in FIG. 6;

FIG. 8 is a schematic rear elevation view of an alternative safety guard utilizing a light beam actuator;

FIG. 9 is a simplified flow chart of the safety guard system for a hydraulic lift gate;

FIG. 10 is a fragmentary perspective view of a lift gate for lifting handicapped persons in wheelchairs into a vehicle which is equipped with a guard according to the present invention; and FIG. 11 is a cross-sectional view taken along the line 11—11 in FIG. 10.

BEST MODE FOR CARRYING OUT THE INVENTION

Figure 1:
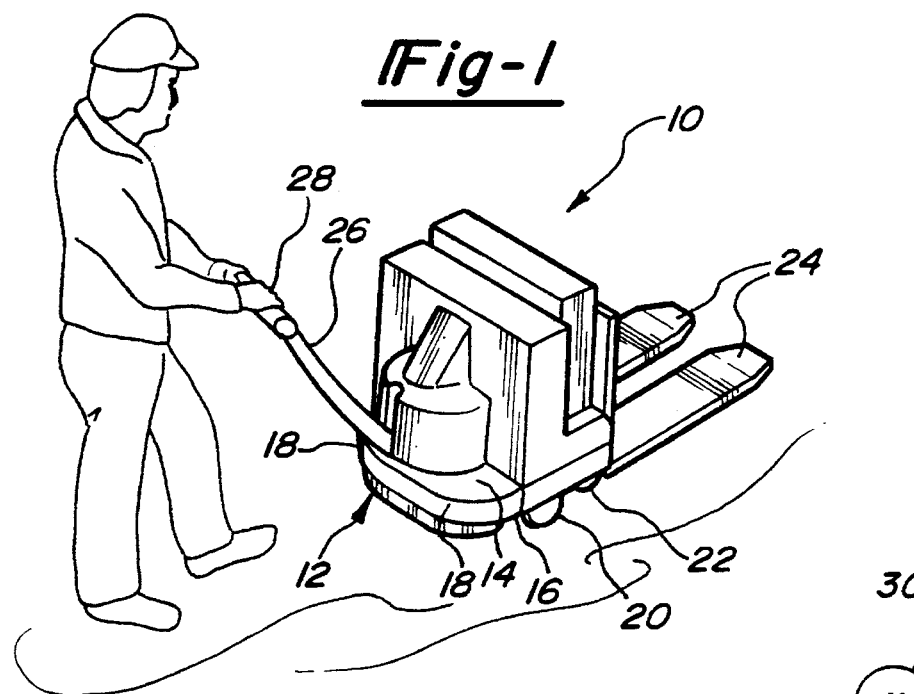
FIG. 1 is a side elevation view of a pedestrian-operated industrial lift truck having the safety guard of the present invention.

Referring now to FIG. 1, a pedestrian-operated industrial lift truck 10 is shown which includes the safety guard 12 of the present invention. Safety guard 12 is attached to a platform 14 forming the bed of the lift truck 10. Platform 14 has a floor facing surface 16 on which the safety guard 12 is preferably mounted. As would be readily appreciated by one of ordinary skill in the art, the safety guard 12 could be alternatively mounted on the lower edge of a rear perimeter portion 18 of the platform 14. However, it is preferred that it be mounted on the floor facing surface 16 to prevent damage to the safety guard 12. The lift truck 10 has drive wheels 20 and front wheels 22. In the illustrated embodiment, however, other wheel arrangements commonly utilized in the pedestrian-operated industrial lift truck could incorporate the safety guard 12 of the present invention.

A pair of forks 24 are provided on the front end of the lift truck 10. A handle 26 extends rearwardly from the rear perimeter 18. Handle 26 has a hand grip control 28 on its distal end. Hand grip control 28 is used to operate the motor 30.

Figure 2:
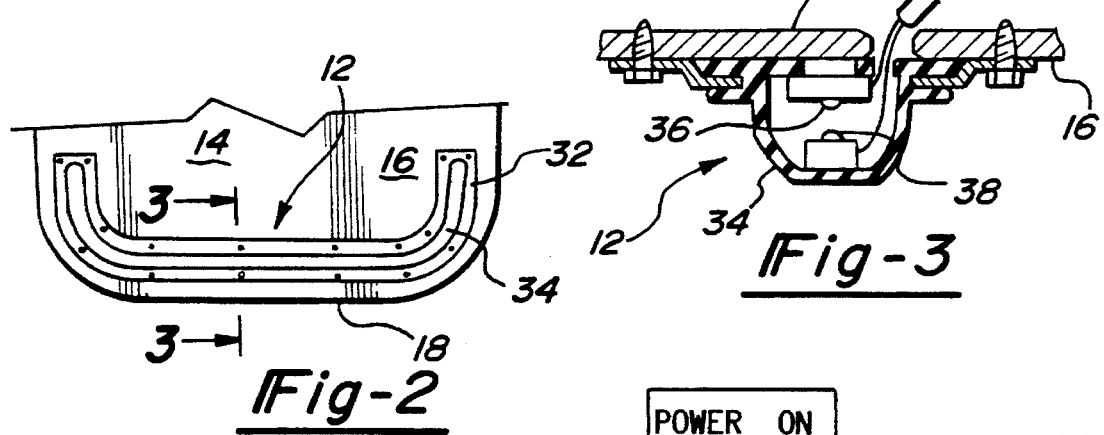
FIG. 2 is a fragmentary bottom plan view taken along the line 2—2 in FIG. 1 showing the strip switch installed on the floor facing surface of the pedestrian-operated industrial lift truck.

Referring now to FIG. 2, the component parts of the safety guard 12 are shown in greater detail. A mounting plate 32 supports a strip switch actuator 34 on the floor facing surface 16 of the platform 14.

Figure 3:
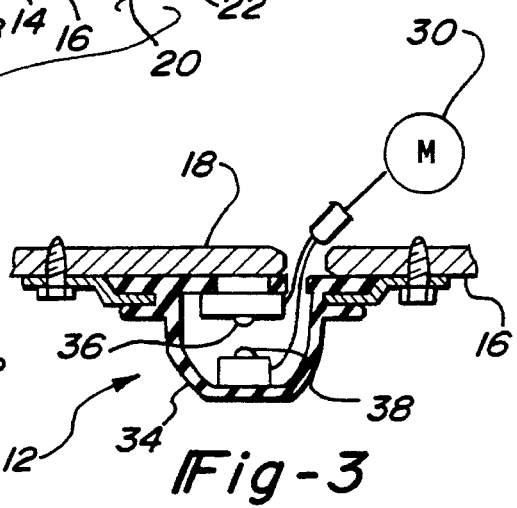
FIG. 3 is a cross-sectional view taken along the line 3—3 in FIG. 2.

Referring now to FIG. 3, first and second contacts 36 and 38 are shown within the strip switch actuator 34. First and second contacts 36 and 38 are connected by wires to the power circuit of the motor 30.

Figure 4:
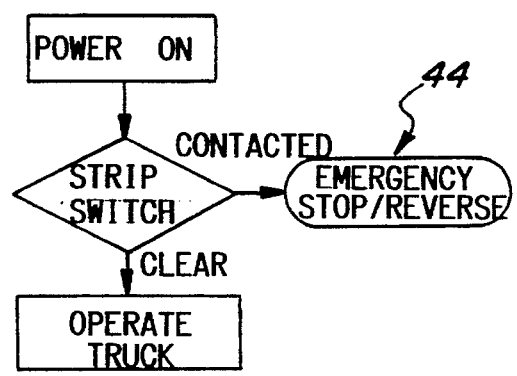
FIG. 4 is a simplified flow chart for the safety guard system for an industrial lift truck.

Referring now to FIG. 4, a simplified flow chart of a portion of the lift truck 10 power circuit is shown wherein the strip switch actuator 34 allows operation of the lift gate when it is clear. When the strip switch actuator 34 is actuated, an emergency stop/reverse function 44 is enabled. Actuation of the strip switch actuator 34 could cause the circuit to either stop the lift gate or reverse the motor 30 to automatically clear any foreign objects being overrun by the lift truck 10.

Figure 5:
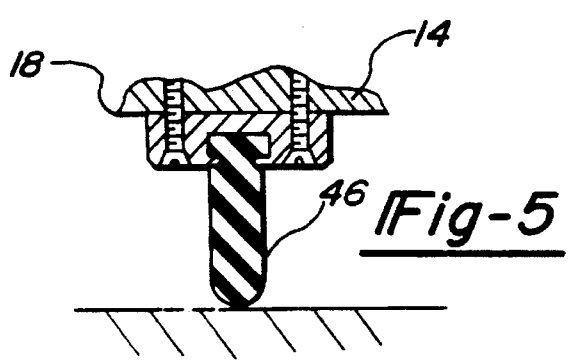
FIG. 5 is a cross-sectional view of a passive guard installed on the floor facing the surface of the pedestrian-operated industrial lift truck.

Referring now to FIG. 5, an alternative embodiment of the present invention is provided wherein the rear perimeter 18 of the platform 14 may be protected by a semi-rigid "passive" guard 46, preferably formed of an elastomeric material. The guard 46 is provided to close the pinch point between the platform 14 and the floor minimizing the possibility of the lift truck 10 overrunning a foreign object such as an operator's foot. This embodiment is simpler and it does not rely on an electrical circuit to perform and may be incorporated on lift trucks simply and easily with minimum cost of retrofitting. If the semi-rigid guard 46 contacts an operator's foot, it is intended to bump the operator's foot and move it rather than allow it to be overrun by the lift truck 10.

Referring now to FIG. 6, a truck 50 having a lift gate 52 is generally illustrated. A safety guard 54 made according to the present invention is provided on the truck 50 adjacent the point at which the lift gate 52 moves as it approaches its raised position. The lift gate 52 is moved by means of hydraulic cylinders 56 in conjunction with guide links 58. The truck bed 60 generally extends somewhat rearwardly of the truck 50. When the lift gate 52 is raised to its raised or upper position, its top surface is essentially coplanar with the top surface of the truck bed 60. In the lower position, the lift gate 52 preferably rests on the ground so that objects to be loaded into the truck can be easily lifted into the truck by first placing them on the platform and then raising the platform to the upper position.

Referring now to FIG. 7, the safety guard 54 is shown in greater detail. The safety guard 54 includes a mounting plate 62 which mounts a strip switch actuator 64.

Referring now to FIG. 8, in an alternative embodiment, a photocell 66 and light source 68 may be used to provide a light beam 70 which spans the lower rear portion of the truck bed 60 so that any object passing through the light beam 70 causes the light beam 70 to be interrupted and halts operation of the hydraulic cylinders 56.

Referring now to FIG. 9, a simplified flow chart for the lift gate is shown wherein the safety switch 54 is connected in the power circuit of the lift gate drive 72. The lift gate drive 72 is connected to safety switch 54 so that when switch 54 is actuated, power to the lift gate drive 72 is interrupted. Alternatively, actuation of the safety switch 54 could be used as an input to an emergency reverse circuit that would cause the lift gate drive 72 to reverse operation for a limited period so that any object caught in the pinch point would be immediately released, minimizing the extent of injury.

Referring now to FIG. 10, another embodiment of the present invention is shown wherein a wheelchair lift gate 80 is provided on a vehicle 82 to lift persons in wheelchairs up to doorway 84 of the vehicle. The doorway 84 includes a lower edge 86 which presents a pinch point as the wheelchair lift gate 80 is raised to its upper position. A safety guard 88 is preferably provided at the end of the wheelchair lift gate 80 closest to the vehicle 82.

Referring now to FIG. 11, a preferred embodiment of a safety guard 88 is an infrared proximity switch actuator 90 which is supported on the wheelchair lift gate 80 by means of a mounting bracket. The infrared proximity switch actuator would have a closely focused proximity sensing system which would be actuated upon placement of an object within a predetermined distance of between a few inches and a few feet above the actuator 90 that would cause the actuator to be actuated or reverse raising of the wheelchair lift gate 80 in a manner similar to that described with regard to the truck lift gate of FIGS. 6–9.

While several different embodiments of the present invention are described above, it will be readily appreciated by one of ordinary skill in the art that many other combinations and variations may be used to achieve the simple and effective safety guard of the present invention. The preceding description of the different illustrated embodiments should not be read to limit the scope of the applicant's invention which should be construed in accordance with the following claims.

What is claimed is:

1. A pedestrian-operated industrial lift truck adapted to be operated on a floor comprising:

a platform body supported over the floor on a plurality of wheels, said platform body and said floor defining a gap therebetween;

a driving motor supported by the platform body and operatively connected in a driving relationship to at least one of said wheels;

a switch electrically connected to the driving motor, said switch being actuable to selectively stop operation of the driving motor; and an actuator coupled to said switch and mounted under a floor facing surface of the platform body, said actuator extending from the floor facing surface towards the floor for engaging a foreign object in the gad between said platform body and said floor whereby said actuator actuates said switch when said platform body overruns foreign objects on the floor which are of sufficient height to contact the actuator.

2. The pedestrian-operated industrial lift truck of claim 1 wherein the actuator is a strip switch spanning the periphery of the platform body.

3. The pedestrian-operated industrial lift truck of claim 1 wherein the actuator is a light source and a photocell, said light source providing a light beam spanning the platform body so that the foreign objects on the floor which are of sufficient height interrupt reception of the light beam by said photocell, whereby said actuator actuates said switch.

4. The pedestrian-operated industrial lift truck of claim 1 wherein the actuator is an infrared proximity sensor.

5. The pedestrian-operated industrial lift truck of claim 1 wherein the switch is connected to a circuit which reverses operation of the driving motor after stopping operation of the driving motor upon actuation of the switch to automatically move clear of the foreign objects on the floor.

* * * * *

UNITED STATES PATENT AND TRADEMARK OFFICE
CERTIFICATE OF CORRECTION

PATENT NO. : 5,465,807
DATED : November, 14, 1995
INVENTOR(S) : HAROLD JOSEPHS

It is certified that error appears in the above-indentified patent and that said Letters Patent is hereby corrected as shown below:

Column 2, line 5,          After "Another" replace "Common" with --common--.

Claim 1, column 6, line 30,    After "the" replace "gad" with --gap--.

Signed and Sealed this

Fifth Day of March, 1996

Attest:

BRUCE LEHMAN

Attesting Officer      Commissioner of Patents and Trademarks